Feb. 3, 1931.     C. P. DEBUCH     1,791,403
TREATMENT OF ORES WITH GASES IN ROTARY FURNACES
Filed Jan. 12, 1928    2 Sheets-Sheet 1
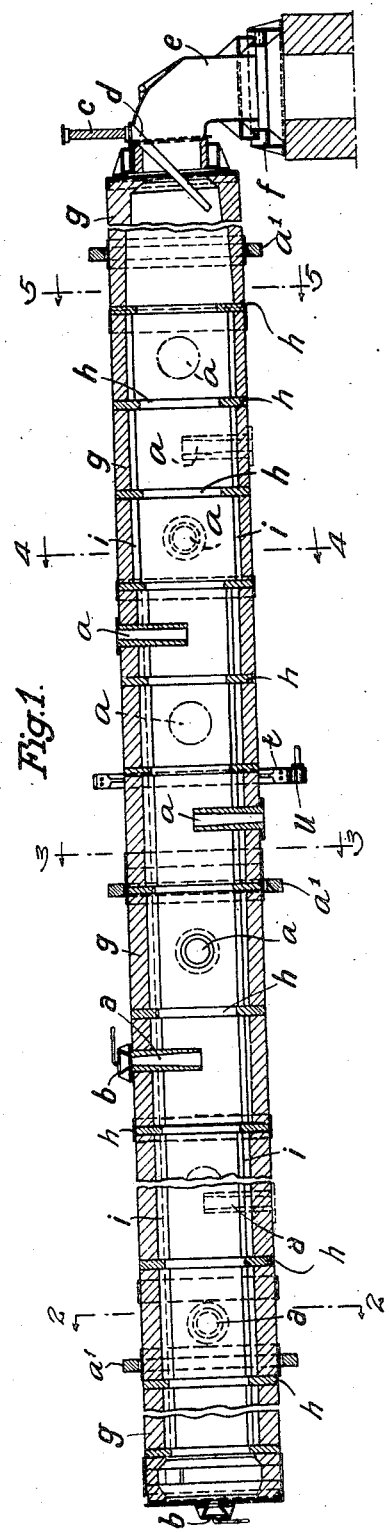
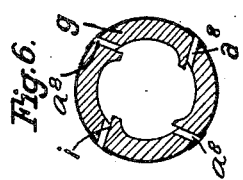
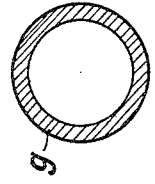
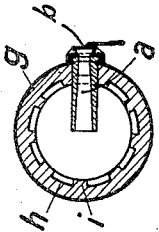
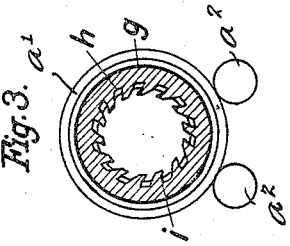
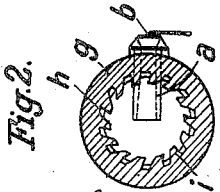
Inventor:
Carl P. Debuch

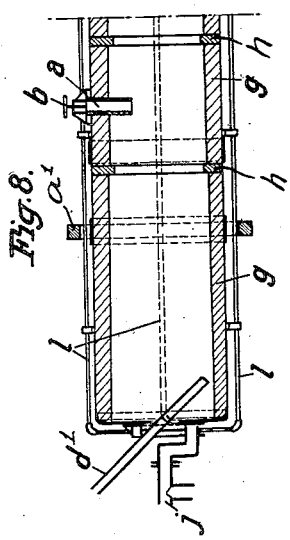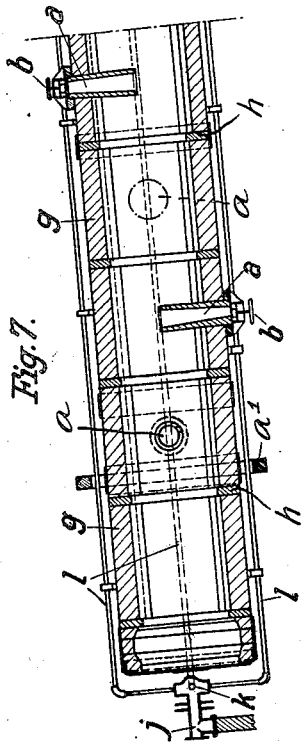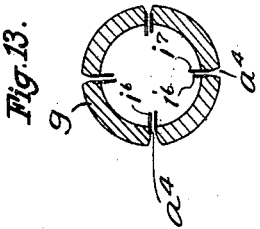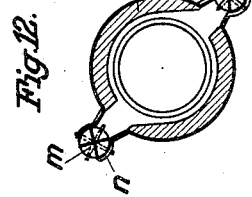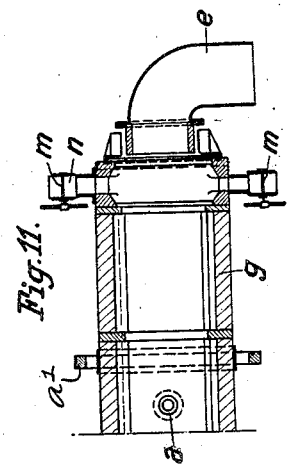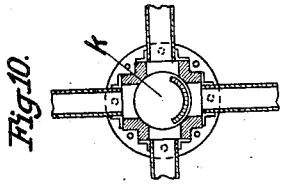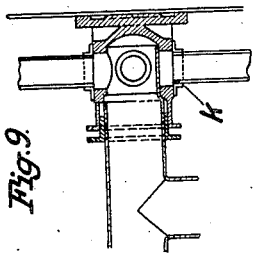

Patented Feb. 3, 1931

1,791,403

UNITED STATES PATENT OFFICE

CARL PAUL DEBUCH, OF BOCHUM, GERMANY

REISSUED

TREATMENT OF ORES WITH GASES IN ROTARY FURNACES

Application filed January 12, 1928, Serial No. 246,259, and in Germany December 20, 1920.

This invention relates to processes for the treatment of ores with gases for the purpose of roasting, reducing and the like and to a rotary tubular furnace suitable for carrying such processes into effect.

Various attempts and proposals of construction have been already made for the purpose of adapting the rotary tubular furnace which has been up to now chiefly used in the cement industry, to the metallurgical processes above referred to, more particularly to the roasting process. It has been however impossible up to now to regulate the course of reaction as well as the generation and distribution of heat in the rotary furnace in such a manner as to avoid any local superheating as well as an excessive cooling of the single furnace zones. As such an exact regulation is an absolute condition for the smooth carrying out of the roasting and similar metallurgical processes in which gases or fuels have to be introduced into the furnace, the rotary tubular furnace has found scarcely any application in that domain.

It has been now found that roasting and the like processes can be carried out in the rotary tubular furnace without any trouble, if instead of supplying the whole quantity of the gases—for instance the roasting air—to be brought into reaction with the material, at one point of the furnace, the supply is distributed over a portion of the furnace length, or over the whole furnace length, namely in such a manner that at each single point is supplied the exact quantity of air or gas which is required for the working process at the point in question and at the given moment, and at the same time the heat of reaction is correspondingly distributed in the furnace by suitable measures.

This is attained by the supply of the gases etc. being effected by means of tubular or slot shaped supply devices which are distributed over the length of the furnace to extend to points adjacent or on the axis thereof and can be singly adjusted or completely shut off. The regulation could also be effected in such a manner that to a given position of the furnace would correspond also a given setting or adjustment of the supply openings, for instance by one series of the openings being entirely closed at time intervals. On the furnace continuing to rotate, these openings will be opened again, whilst at the same time another series of openings will be closed or shut off from the gas supply. The supply of the gases to be brought into reaction with the material could be effected at an increased pressure or by suction draft.

Owing to the described distribution of the inlet openings for the gases to be brought into reaction with the material, over a portion of the furnace length, or over the whole furnace length, the zone of reaction is extended over a large portion of the furnace. This increase of the zone of reaction is further assisted according to the invention, more particularly when roasting ores, by moving the ore to be treated, with different speed in the different furnace sections, namely in such a manner that in the first furnace section, the chief reaction zone, the material is moved or advanced more quickly than in the following furnace sections. This ensures, more particularly when roasting ores, that in the first furnace section the quantity of sulphur converted is reduced, and fritting is avoided, and that in the following furnace sections in which the reaction takes place less energetically and the temperature is correspondingly lower, the sulphur contents of the ore and the heat quantity generated by its combustion are still sufficiently great to ensure a complete roasting.

At the same time, the whole heat of reaction generated is distributed over the furnace in the most favourable manner by a series of measures. In order to avoid local cooling by the gases admitted into the furnace, it is advisable to heat them before their admission into the furnace. This is made possible by passing the inlet conduits through the furnace wall, so that the heat of the wall, more particularly of the furnace lining, is partly given off to the gases introduced. A further improvement in the distribution of heat in the furnace is obtained by making the lining of the furnace in the chief reaction zone, that is to say at the point of the greatest heat generation, thinner than in the other zones of the furnace, so that the excess of heat can be carried away from this point of radiation, thus avoiding local superheating otherwise easily taking place which gives rise to the fritting and sometimes even to the melting of the material. As a further means for the rational distribution of the heat generated in the furnace is the step consisting in carrying the excess of heat by conduction from the hottest points of the furnace to the colder points, the furnace lining constituting the heat conductor. This process of heat conduction through the furnace lining is regulated by making the lining of the furnace of different thickness at different furnace zones, namely in such a manner that the lining at the cooler points of the furnace has a considerable thickness and constitutes a heat accumulator in which collects the excess of heat from the main reaction zone in which the lining has a smaller thickness.

It is necessary, more particularly when roasting ores which are poor in sulphur or difficult to roast, such as for instance zinc blende, to introduce fuels into the furnace when the quantity of heat generated by the reaction itself, is not sufficient for a complete roasting in the last furnace portion. In such a case, according to this invention, fuel is introduced into the furnace behind the chief reaction zone. The introduction could be effected through the furnace head or the furnace casing or jacket, or simultaneously through the furnace head and furnace casing. As fuel could be used any desired gaseous, liquid or solid combustible substances in a state of suitable fine division. As solid fuel could also be used the ore to be treated, in the form of fine powder.

The gases escape from the furnace through a gas discharge pipe which is constituted by a fixed and a movable part and participates in all the movements of the furnace head, with the exception of the movement of rotation. At the junction, the two pipes are made with double walls and fit into each other. The bottom pipe end forms an annular cup which is filled with a sealing liquid. Into the liquid dips the upper pipe end. As the upper pipe section has also double walls at the end, and its inner portion has a smaller diameter than the bottom pipe, a contamination of the sealing liquid by the impurities carried by the gases is avoided. As the sealing liquid should be preferably used a liquid which is neither affected by the reaction gases nor does itself affect the reaction. When roasting sulphide ores for instance, the sealing liquid could be preferably a mineral oil.

The movable part of the discharge device is preferably curved downwards, it could be however also curved upwards.

The discharge of the waste or deads from the furnace is effected in such a manner that penetration of air into the furnace as well as escape of gases through the discharge opening, are avoided.

Constructions of the apparatus according to the invention are diagrammatically illustrated by way of example in the accompanying drawings. In said drawings:

Figure 1 is a longitudinal sectional view of one form of the improved furnace of this invention.

Figure 2 is a transverse section substantially on the line 2—2 of Figure 1.

Figure 3 is a similar section substantially on the line 3—3 of Figure 1.

Figure 4 is a section substantially on the line 4—4 of Figure 1.

Figure 5 is a transverse section substantially on the line 5—5 of Figure 1.

Figure 6 is a view similar to Figures 2 to 5 inclusive, illustrating a slight modification.

Figures 7 and 8, are partial views in longitudinal section of modified forms of the improved furnace of Figure 1.

Figures 9 and 10, show in detail an element of Figure 7.

Figures 11 and 12, are views of one form of the ore discharge end of the furnace.

Figure 13 is a view similar to Figures 2 to 6 inclusive illustrating another modification.

Figure 14 is a more or less diagrammatic view.

Figure 1 shows in longitudinal section a rotary tubular furnace which is more particularly suitable for the roasting of ores with the use of suction draft. Rotation of the furnace may be effected by any suitable means. As shown a gear $t$ surrounds and is connected with the furnace shell and such gear is engaged by a driving pinion $u$. The body of the furnace is shown as provided with annular rail members $a'$ which are supported by rolls $a^2$. The movement of the roasting air takes place in this furnace in the opposite direction to that of the ore. $a$ are nozzles distributed throughout the length of the furnace and provided with adjustable regulating devices $b$. The ore is supplied to the furnace by means of a worm $c$ and shoot $d$. The roasting gases escape from the furnace through the bend $e$ and the short connection pipe $f$. The ends of these elements $e$ and $f$ are made with double walls and overlap to form an annular cup which is filled with a liquid thereby providing a hydraulic seal. The lining $g$ of the furnace increases in thickness towards the furnace ends. By means of brick rings $h$, the furnace is divided into several chambers or zones. The prongs $i$ are arranged in a different number at the different furnace zones, and their size and construction are different, as may be seen from the cross sections through the furnace shown in Figures 2 to 6. Owing to the prongs being of different shapes in the different zones, the action of those in each zone on the material is somewhat different from that of the prongs in the other zones. For instance, the prongs $i$ in the zone shown in Figure 2 will lift the ore and let it fall in the form of a screen across the furnace so that the progress of the ore longitudinally through said zone will be relatively slower than in the zone shown in Figure 4, for example, where the shape of the prongs is such that they will lift the material to a lesser extent and convey it through said zone at an increased speed compared with the prongs in the zone shown in Figure 2.

Comparing the cross sectional shapes of the prongs shown in Figures 2, 3 and 4, it will be seen that the faces of the prongs in the zone represented in Figure 4 are substantially parallel with the axis of the furnace shell while the faces of the prongs in the zones represented in Figures 3 and 2 are inclined to, and out of substantial parallelism, with the said axis. The effect of having the prongs of different forms in the several zones is, as above noted, to provide for feeding the ore through the zone represented by Figure 4 at a greater speed than through the zones represented by Figures 3 and 2 and in zone represented by Figure 3 at a speed less than that at which it travels through the zone represented in Figure 4, but faster than it is moved through the zone represented in Figure 2. Figures 2–6 show also the different thickness of the furnace lining $g$ in the different furnace zones.

Figure 6 illustrates a modified form of air inlet nozzles. In this arrangement the prongs $i$ are positioned adjacent the inner ends of the air inlets $a^8$ and serve also as baffles for checking leakage through such air inlets.

According to a further modification, shown in Figure 13, the two sets of prongs $i^6$, $i^7$ are arranged at the inner ends of the air inlets $a^4$, the prongs $i^7$ being radially somewhat longer than the prongs $i^6$.

The relative arrangement of the prongs in the several zones of the furnace is illustrated diagrammatically in Figure 14, referring to which it will be seen that the prongs $i^3$ extend substantially parallel with the furnace axis, while the prongs $i'$, $i^2$ are arranged at an angle to such axis.

Figures 7 and 8 show constructions of rotary tubular furnaces for carrying out metallurgical processes in which air or other gas is supplied not by suction, but under pressure.

In Figures 7 and 8, $b'$ are the adjustable closing devices for the inlet nozzles $a$, and $j$ is the main gas pipe. In Figure 7, $k$ is a four way cock, by means of which single branch pipes $l$, and thereby at the same time the nozzle series connected to them, can be shut off from the gas supply pipe. The construction of the fourway cock $k$ is shown in Figures 9 and 10. Figure 8 shows a construction of the furnace in which the ore and gas are moved in the same direction through the furnace, the ore being supplied by way of a shoot $d'$. In Figures 11 and 12 is shown a device for the discharge of the deads with exclusion of air, the construction of which is clearly shown in cross section in Figure 12. A drum $m$ divided into four sectors, is mounted in a rotatable manner, with an air tight joint, in a drum casing $n$ secured to the furnace wall and open towards the furnace interior and the atmosphere. The deads pass into the sector which is facing at the time the furnace sole, and on the drum $m$ rotating, are conveyed outwards without any large quantities of air being able to get into the furnace, or gases being able to escape from the furnace.

Modifications may thus be made without departing from the spirit and scope of the invention as defined by the appended claims.

What I claim and desire to secure by Letters Patent of the United States is:—

1. A furnace for treating ore comprising a rotary shell provided with gas inlets at points spaced longitudinally of the length of the shell and having a lining which is of gradually increasing thickness from a main reaction zone toward the discharge end of the furnace, whereby excess heat is conducted toward and accumulated in the zone adjacent said discharge end.

2. A furnace comprising a rotatable shell, means for rotating said shell, rings built in said shell dividing the same into zones, driver prongs extending lengthwise of said zones, the prongs of one zone differing from the prongs of adjacent zones, whereby the material will be moved through one zone at a speed different from that at which it is moved through other zones spaced apart gas inlets extending through said shell, means for feeding ore to the interior of said shell, and means for discharging treated ore therefrom.

3. A furnace comprising a rotatable cylindrical shell having its end portions of greater thickness than its central portion, means for rotating said shell, rings built in said shell dividing the same into zones, driver prongs extending lengthwise of said zones, the prongs of one zone differing in shape from the prongs of adjacent zones, so that the faces of the prongs in one zone extend at an angle to the axis of the shell different from that between the faces of prongs in other zones and said axis, spaced apart gas inlets extending through said shell, means for feeding ore to the interior of said shell, and means for discharging treated ore therefrom.

4. A furnace comprising a rotatable cylindrical shell having end portions of greater thickness than its central portion, a gas inlet at one end of said shell, an ore inlet at the other end of said shell, a gas discharge pipe communicating with the shell at the ore inlet end thereof, means for rotating said shell, rings built in said shell dividing the same into zones, driver prongs extending lengthwise of said zones, the prongs of one zone differing in shape from the prongs of adjacent zones, whereby the prongs in one zone will feed material therethrough at a different speed from that at which the prongs in other zones feed the material, spaced apart gas inlets extending through said shell at points intermediate its ends, and means for discharging treated ore from said shell.

5. A furnace comprising a rotatable cylindrical shell having end portions of greater thickness than its central portion, a gas inlet at one end of said shell, an ore inlet at the other end of said shell, a gas discharge pipe communicating with the shell at the ore inlet end thereof, a liquid seal connection in said gas discharge pipe, means for rotating said shell, rings built in said shell dividing the same into zones, driver prongs extending lengthwise of said zones, the prongs of one zone differing in shape from the prongs of adjacent zones, whereby the prongs of one zone will feed material lengthwise of the shell at a different speed from prongs in other zones, spaced apart gas inlets extending through said shell at points intermediate its ends, and means for discharging treated ore from said shell.

CARL PAUL DEBUCH.